US011420611B2

United States Patent
Matsumiya et al.

(10) Patent No.: US 11,420,611 B2
(45) Date of Patent: Aug. 23, 2022

(54) BRAKING FORCE CONTROL APPARATUS (71) Applicant: TOYOTA JIDOSHA KABUSHIKI KAISHA, Toyota (JP)

(72) Inventors: Yuki Matsumiya, Nagoya (JP); Shun Sato, Toyota (JP); Hiroya Fujiwara, Nagoya (JP); Masahiro Nishiu, Toyohashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 120 days.

(21) Appl. No.: 15/929,256

(22) Filed: Apr. 9, 2020

(65) Prior Publication Data
US 2020/0339098 A1 Oct. 29, 2020

(30) Foreign Application Priority Data
Apr. 26, 2019 (JP) .............................. JP2019-086025

(51) Int. Cl.
*B60W 10/18* (2012.01)
*B60W 10/08* (2006.01)

(52) U.S. Cl.
CPC ............ *B60W 10/18* (2013.01); *B60W 10/08* (2013.01); *B60W 2510/1005* (2013.01); *B60W 2510/244* (2013.01); *B60W 2520/105* (2013.01)

(58) Field of Classification Search
None
See application file for complete search history.

(56) References Cited

U.S. PATENT DOCUMENTS

| 2009/0259370 | A1 | 10/2009 | Kaigawa et al. |
| 2012/0098502 | A1 | 4/2012 | Hori |
| 2015/0375747 | A1* | 12/2015 | Shishido ............ B60L 15/2009 701/48 |
| 2016/0264125 | A1* | 9/2016 | Kanno .................. B60W 10/26 |
| 2017/0166194 | A1 | 6/2017 | Kumazaki et al. |
| 2017/0197610 | A1* | 7/2017 | Sato ....................... B60K 6/445 |

FOREIGN PATENT DOCUMENTS

| JP | 10-280990 A | 10/1998 |
| JP | 2006-297994 A | 11/2006 |
| JP | 2012-092673 A | 5/2012 |
| JP | 2017-112666 A | 6/2017 |

* cited by examiner

*Primary Examiner* — Todd Melton
*Assistant Examiner* — Jason R Roberson
(74) *Attorney, Agent, or Firm* — Oblon, McClelland, Maier & Neustadt, L.L.P.

(57) ABSTRACT

A braking force control apparatus includes: a prediction unit that predicts a time from a present time until a next start of the gear shift operation in the stepped automatic transmission based on a speed of the vehicle; an acquisition unit that acquires a state of a battery charged by a regenerative power generation of the regenerative generator; and a control unit that stops the regenerative power generation by the regenerative generator before the gear shift of the stepped automatic transmission is started, when it is determined, during the regenerative power generation by the regenerative generator, that the regenerative power generation by the regenerative power generator may be stopped due to the state of the battery during the gear shift operation of the stepped automatic transmission, based on a prediction result by the prediction unit and the state of the battery acquired by the acquisition unit.

3 Claims, 5 Drawing Sheets

BRAKING FORCE CONTROL APPARATUS

INCORPORATION BY REFERENCE

The disclosure of Japanese Patent Application No. 2019-086025 filed on Apr. 26, 2019 including the specification, drawings and abstract is incorporated herein by reference in its entirety.

BACKGROUND

1. Technical Field

The present disclosure relates to a braking force control apparatus that is mounted in a vehicle and controls the braking force of the vehicle.

2. Description of Related Art

In vehicles, various technologies have been proposed in order to improve comfortable riding feeling and operational feeling. For example, Japanese Patent Application Publication No. 10-280990 discloses a fuel cut control apparatus that supplements a deceleration force by an alternator, an air conditioner, a brake, a gear shift, etc., in order to obtain an expected deceleration force when fuel cut is prohibited to prevent catalyst deterioration at a high catalyst temperature, during vehicle deceleration. Japanese Patent Application Publication No. 2006-297994 discloses a vehicle integrated control apparatus that distributes a control target determined depending on the operation amount by an user to a drive system and to a control system according to their assignment ratios, while sending the control target before the distribution to a stabilization system to bring this system to perform correction, to thereby eliminate a necessity to synchronize distribution values of the control target to reduce delay, thus improving responsiveness to an operation. Japanese Patent Application Publication No. 2012-92673 discloses a vehicle power generation control apparatus that limits amount of power generation at the time of regenerative power generation to a decreasing direction so as to set a difference between a torque of the generator when the battery is charged and a torque of the generator when the battery is not charged to be within a predetermined difference in torque, to thereby reduce influence to the riding comfort due to the start or stop of the regenerative power generation.

SUMMARY

Generally, when a vehicle enters a coasting state in which neither an accelerator pedal nor a brake pedal is depressed by a user, an acceleration in a deceleration direction is generated in the vehicle by an engine, a transmission, a regenerative generator, and the like. At this time, if the transmission is a stepped automatic transmission, a gear downshift occurs in accordance with decrease in speed of the vehicle. There is a certain transition period in the downshift operation in the transmission, and if an input torque to the transmission varies during this transition period, the gear ratio and the output torque become temporarily unstable because of the internal structure of the transmission, which may cause a shift shock such as sudden vibrations to the vehicle.

During the coasting, a torque from the wheel side caused by the inertial force of the vehicle is distributed and input to the generator and the transmission. When the state of the regenerative power generation by the generator is transited from the execution state to the stop state, the absolute value of the input torque to the generator is decreased due to decrease in regenerative load, and thus the absolute value of the input torque to the transmission is accordingly increased. Since the control on the gear shift of the transmission and the control on the regenerative power generation are executed independently of each other, the regenerative power generation may stop during the downshift transition period in the coasting state, and thus the comfortable riding feeling may be deteriorated due to a shift shock.

The present disclosure has been made in light of the above problems, and an object of the present disclosure is to provide a braking force control apparatus that can realize a suitable riding comfort in a coasting state of a vehicle.

In order to solve the above problems, one aspect of the present disclosure is a braking force control apparatus controlling a regenerative generator in a vehicle in which a negative force with a traveling direction of the vehicle set to be positive is generated by at least a stepped automatic transmission and the regenerative generator, the braking force control apparatus including: a prediction unit that predicts a time from a present time until a next start of a gear shift operation occurs in the stepped automatic transmission based on a speed of the vehicle; an acquisition unit that acquires a state of a battery charged by the regenerative power generation of the regenerative generator; and a control unit that stops the regenerative power generation by the regenerative generator before the gear shift of the stepped automatic transmission is started, when it is determined, during the regenerative power generation by the regenerative generator, that the regenerative power generation by the regenerative generator may be stopped due to the state of the battery during the gear shift operation of the stepped automatic transmission, based on a prediction result by the prediction unit and the state of the battery acquired by the acquisition unit.

The present disclosure can provide a braking force control apparatus capable of realizing a suitable riding comfort in a coasting state of a vehicle.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A braking force control apparatus according to the present disclosure, when determining that regenerative power generation by a generator may be stopped during a gear shift operation of a transmission, stops the regenerative power generation by the generator before the gear shift of the transmission is started. Thereby, a shift shock due to the stop of the regenerative power generation during the gear shift operation of the transmission is reduced.

First Embodiment

Hereinafter, the first embodiment will be described in detail with reference to the drawings. Note that a speed, an acceleration, and the like are represented by values with reference numerals while the vehicle traveling direction is set in a positive direction.

Configuration

Figure 1:
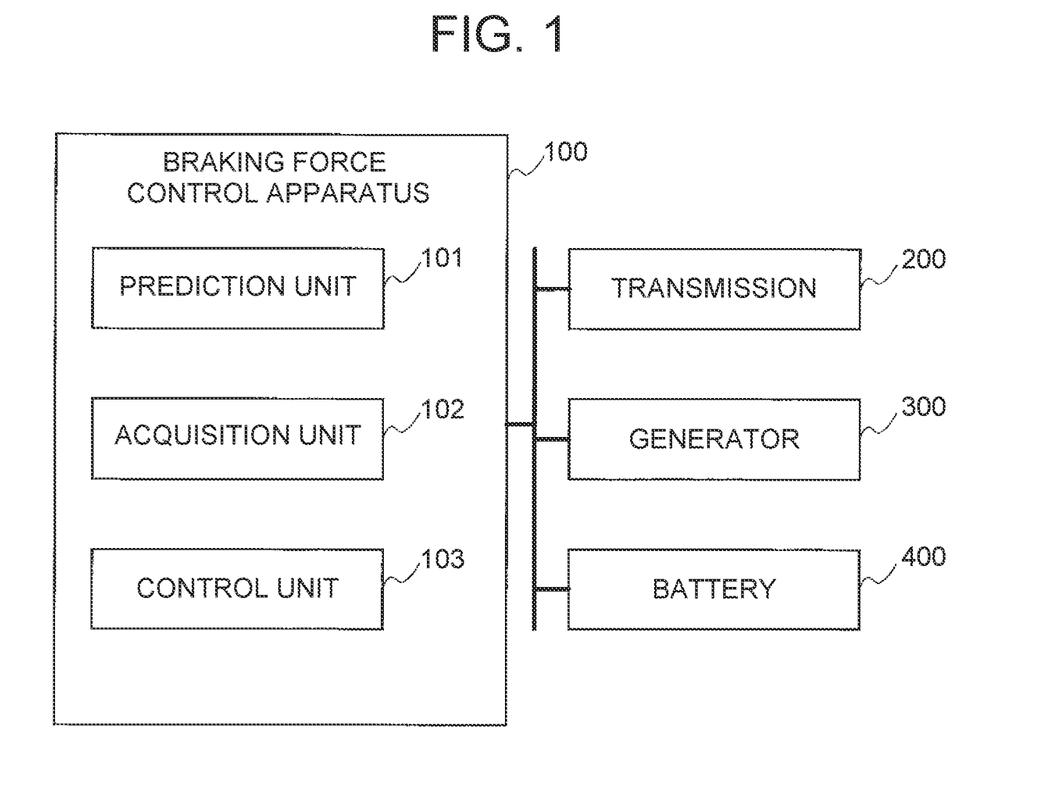
FIG. 1 is a view showing a configuration of a braking force control apparatus and surroundings thereof according to first and second embodiments.

FIG. 1 shows a configuration of a braking force control apparatus 100 and surroundings thereof mounted in a vehicle according to the present embodiment. The vehicle includes the braking force control apparatus 100, a transmission 200 that is a stepped automatic transmission, a generator 300 that can perform regenerative power generation such as an alternator and a motor, and a battery 400 that charges electric power from the regenerative power generation by the generator 300. The transmission 200 and the generator 300 can generate a braking force while the vehicle is in a coasting state. The braking force can be generated by an apparatus such as an engine (not shown) other than the transmission 200 and the generator 300. The vehicle further includes a transmission control unit that controls the gear shift of the transmission 200, and a charge control unit that performs charge-discharge control on the battery 400 and control on the regenerative power generation of the generator 300 based on the current, voltage, temperature, power storage rate, etc., of the battery 400. In FIG. 1, these control units are included in the transmission 200, the generator 300, and the battery 400, and thus illustrations thereof will be omitted. Other than these control units, various sensors and devices are mounted in the vehicle.

The braking force control apparatus 100 includes a prediction unit 101, an acquisition unit 102, and a control unit 103. The prediction unit 101 predicts a time from a current time until a next start of the gear shift operation occurs in the transmission 200 during the coasting state. The acquisition unit 102 acquires a state of the battery 400. The control unit 103 controls the operations of the prediction unit 101 and the acquisition unit 102, and at the same time when determining that the regenerative power generation by the generator 300 may be stopped due to the state of the battery 400 during the gear shift operation of the transmission 200, based on the prediction result of the prediction unit 101 and the acquisition result of the acquisition unit 102, the control unit 103 stops the regenerative power generation by the generator 300 before the start of the gear shift of the transmission 200.

Process

Figure 2:
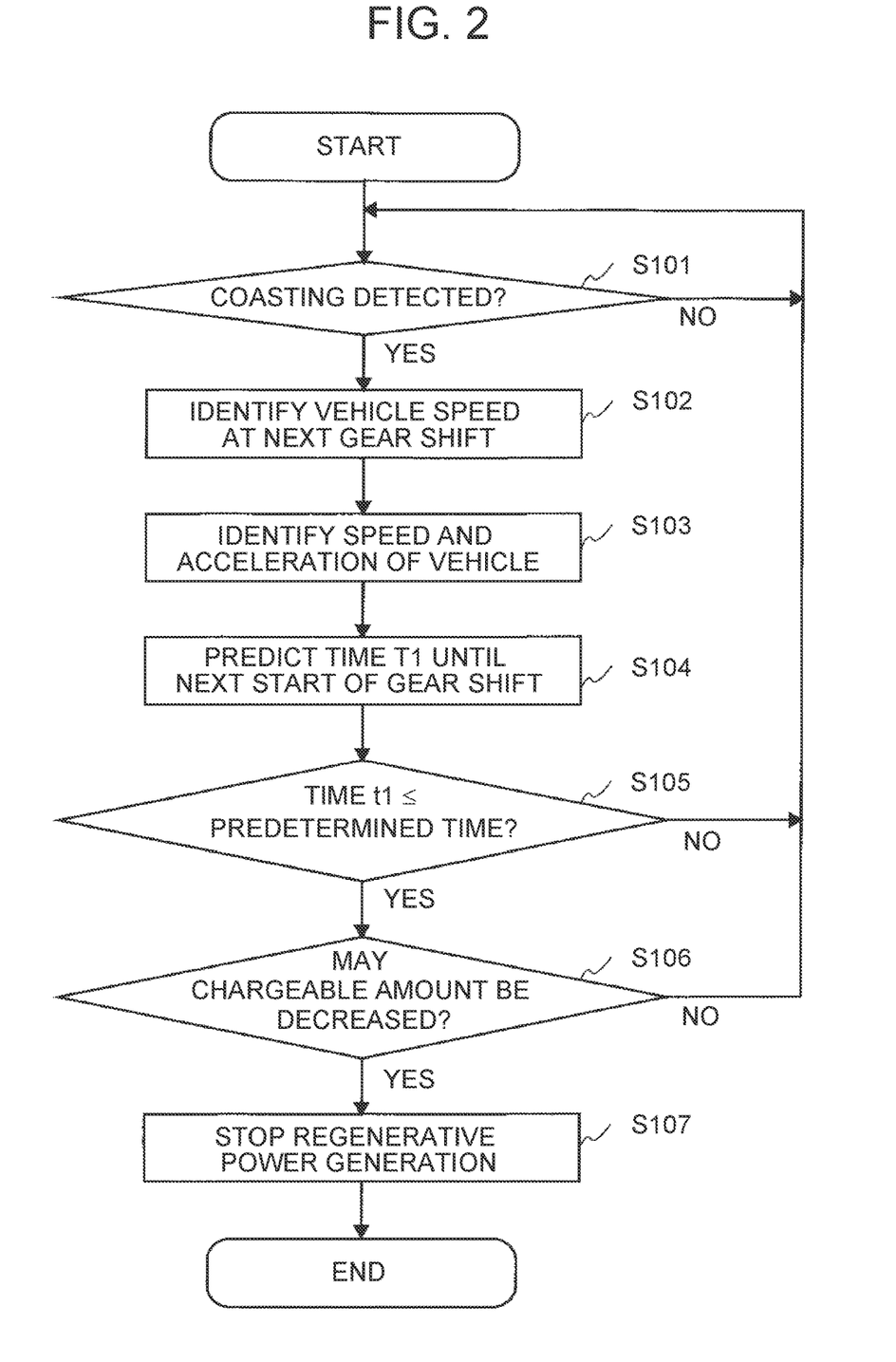
FIG. 2 is a flowchart showing the process according to the first embodiment.

FIG. 2 is a flowchart showing an example of the control of the regenerative power generation executed by the braking force control apparatus 100 while the user is driving the vehicle. This process is executed in a state in which the regenerative power generation by the generator 300 is possible while the vehicle is traveling.

(Step S101): The control unit 103 constantly acquires the amount of operation of an accelerator pedal and the amount of operation of a brake pedal operated by the user, which are respectively detected by an accelerator pedal sensor and a brake pedal sensor that are provided to the vehicle. Based on the acquired amount of operation of the accelerator pedal and the acquired amount of operation of the brake pedal, the control unit 103 detects that the vehicle is in a state of coasting by detecting that the user does not operate the accelerator pedal (the amount of operation is 0), and the user does not operate the brake pedal (the amount of operation is 0). When the control unit 103 detects the coasting state, the process proceeds to step S102; and when the control unit 103 does not detect the coasting state, the control unit 103 repeats step S101 and waits for the vehicle to enter the coasting state.

(Step S102): The prediction unit 101 identifies the vehicle speed at which a next start of the gear shift operation occurs in the transmission 200. The identifying method will be described as below.

Figure 3:
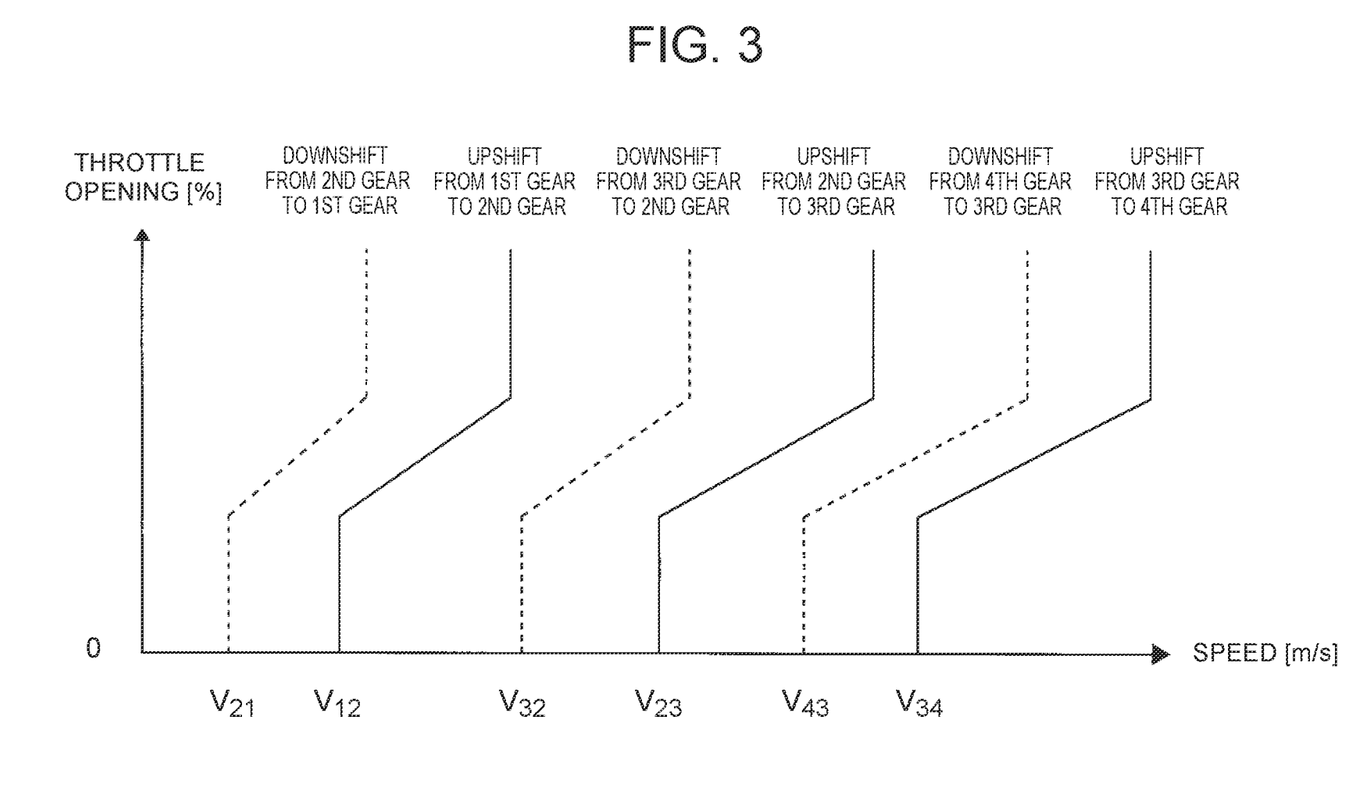
FIG. 3 is a view showing an example of a gear shift map according to the first and the second embodiments.

The prediction unit 101 holds a map representing the characteristics of the gear shift control of the transmission 200 performed by the transmission control unit that controls the transmission 200. FIG. 3 shows an example of the map. In the map shown in FIG. 3, the gear stage of the transmission 200 is determined based on the speed and the throttle opening of the vehicle. In increase of the speed of the vehicle, when the vehicle speed is increased to a speed at a current throttle opening indicated by a gear shift line of each solid line in the map, an upshift is started. Further, in decrease of the vehicle speed, when the vehicle speed is decreased to a speed at a current throttle opening indicated by a gear shift line of each dotted line in the map, a downshift is started. In this step, the vehicle is in the coasting state, so that the throttle opening is 0 and the vehicle speed is being decreased. Therefore, the prediction unit 101 acquires a current gear stage of the transmission 200, and identifies the speed at which the downshift from this gear stage is started at the throttle opening 0, to thereby identify a speed at which a next start of the gear shift operation occurs in the transmission 200. In the example shown in FIG. 3, when the current gear stage is at third gear, the prediction unit 101 identifies a speed $V_{32}$ at the throttle opening of 0 indicated by the gear shift line for downshifting from third gear to second gear, as a speed at which a next start of the gear shifting operation occurs in the transmission 200.

(Step S103): The prediction unit 101 identifies a current speed v and a current acceleration a of the vehicle. The speed v can be identified by appropriately acquiring the current speed and the acceleration from a speed sensor provided to the vehicle or another device connected to the in-vehicle network. The acceleration a can be identified, for example, by acquiring vehicle speeds v at a plurality of time points and calculating the time change rate thereof. Alternatively, the prediction unit 101 may acquire the acceleration a from an acceleration sensor provided to the vehicle, or another device connected to an in-vehicle network. Note that instead of executing step S102, after identifying the speed v in this step, the prediction unit 101 may identify a speed at which a next start of the gear shift operation occurs in the transmission 200 based on the speed v and the above-described map.

(Step S104): The prediction unit 101 predicts time t1 from the current time until a next start of the gear shift operation occurs in the transmission 200. Assuming that the acceleration a of the vehicle is constant, the prediction unit 101 predicts time t1 from the current time until the next start of the gear shift operation occurs in the transmission 200, based on the current speed v and a speed V at which the next start of the gear shift occurs in the transmission 200, and the acceleration a by using the following Formula (1):

$$t1=(v-V)/|a| \qquad \text{Formula (1)}.$$

(Step S105): When time t1 predicted by the prediction unit 101 is equal to or less than predetermined time, the control unit 103 brings the process to proceed to step S106, and when time t1 is more than the predetermined time, the control unit 103 brings the process to proceed to step S101.

(Step S106): The acquisition unit 102 acquires a state of the battery 400 that is charged by regenerative power generation of the generator 300. The state of the battery 400 is not limited to a specific one as long as this provides a prediction regarding a chargeable amount of the battery 400 that is amount of power currently chargeable, and this includes at least one of a power storage rate (SOC) and a charge current integrated value from the time point of charging start time. The acquisition unit 102 can acquire the above state of the battery 400 from various sensors provided to the battery 400, and from a charge control unit that performs control of the charge-discharge of the battery 400 and control of the regenerative power generation of the generator 300. Alternatively, the acquisition unit 102 may acquire information as source data used for calculating the state of the battery 400 from the various sensors, the charge control unit, etc., and may calculate the state based on the acquired information.

Based on the state acquired by the acquisition unit 102, the control unit 103 determines whether or not the chargeable amount of the battery 400 may be lower than a predetermined value. For example, the control unit 103 can determine that the chargeable amount may be decreased when the power storage rate is equal to or more than a predetermined value, or when the charge current integrated value is equal to or more than the predetermined value. The control unit 103 determines that the chargeable amount of the battery 400 may be decreased when any or all of the one or more states acquired by the acquisition unit 102 are within a predetermined range, and then the process proceeds to step S107; and otherwise, the process proceeds to step S101.

(Step S107): In this step, it is predicted that the charge control unit, which controls the charge-discharge of the battery 400 as well as the regenerative power generation of the generator 300, will stop the regenerative power generation by the generator 300 in the near future in order to protect the battery 400. In such a case, it can be determined that the regenerative power generation by the generator 300 may be stopped due to the state of the battery 400 during the gear shift operation of the transmission 200. The control unit 103 requests the charge control unit to stop the regenerative power generation so as to stop the regenerative power generation by the generator 300 before the transmission 200 downshifts. This is the end of the process.

When the accelerator pedal sensor and the brake pedal sensor provided to the vehicle detect operation of the accelerator pedal or operation of the brake pedal by the user during execution of the process in steps S102 to S107, the process is stopped and proceeds to step S101, in which the process is then suspended until the coasting state is established. Separately from this process, conventional control of acceleration, deceleration, gear shift, and the like according to the detected operation of the accelerator pedal or the detected operation of the brake pedal is performed by another control unit.

After the regenerative power generation is stopped by the above process in step S107, when the regenerative power generation by the generator 300 becomes possible because the power storage rate of the battery 400 decreases below a predetermined value or the like, the regenerative power generation is resumed by another control unit provided to the vehicle, such as the charge control unit. In this case, the above-described process is executed again.

Figure 4:
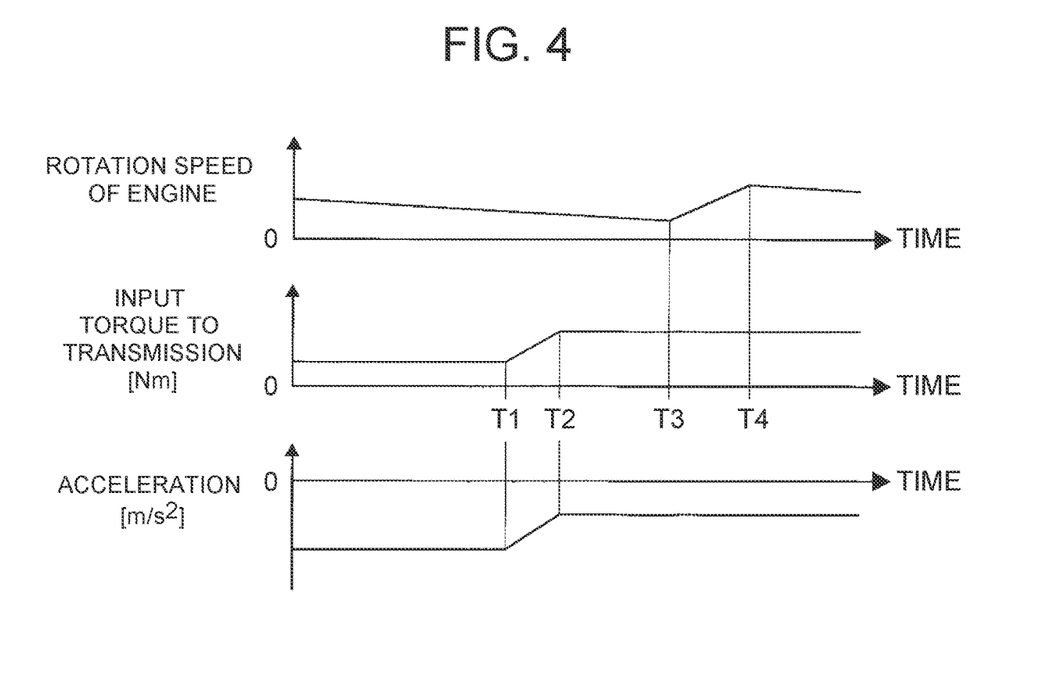
FIG. 4 is a view showing an example of the process according to the first embodiment.

Description will be provided on an example of the control based on the above process. FIG. 4 shows that respective horizontal axes represent time, respective vertical axes represent a rotation speed of the engine, an input torque from the wheel side to the transmission 200, and an acceleration of the vehicle, and also shows respective time charts according to the process in this embodiment. In the entire period shown in FIG. 4, the vehicle is in the coasting state, and the acceleration of the vehicle is negative due to the negative driving force.

It is assumed that at time T1, the predicted time t1 until a next gear shift is equal to the predetermined time. Until time T1, the predicted time t1 until the next gear shift occurs is more than the predetermined time, and thus a loop returning from step S105 to step S101 is established in the above-described process. Alternatively, until time T1, even when the predicted time t1 until the next gear shift is equal to or less than the predetermined time, it is not determined that the chargeable amount of the battery 400 may be decreased, and thus a loop returning from step S106 to S101 is established.

At time T1, the predicted time t1 until the next gear shift is equal to or less than the predetermined time, and the chargeable amount of the battery 400 may be decreased, so that step S107 is executed to stop the regenerative power generation. The regenerative power generation is stopped and the absolute value of the input torque from the wheel side to the generator 300 thus gradually decreases; accordingly, the absolute value of the input torque to the transmission 200 gradually increases during a period from time T1 to T2, and at the same time, the acceleration of the vehicle gradually increases (the deceleration force decreases).

At time T3 after time T2, a next gear shift is started, and the transmission 200 shifts, for example, from third gear to second gear. A period from time T3 to T4 is a transition period of the gear shift operation. From time T1 to time T3, the rotation speed of the engine gradually decreases, but the rotation speed gradually increases during the transition period. After time T4 when the gear shift operation is ended, the rotation speed gradually decreases again. In FIG. 4, it is assumed that after time T2, the acceleration of the vehicle does not change before and after the gear shift, but this may actually change.

Figure 5:
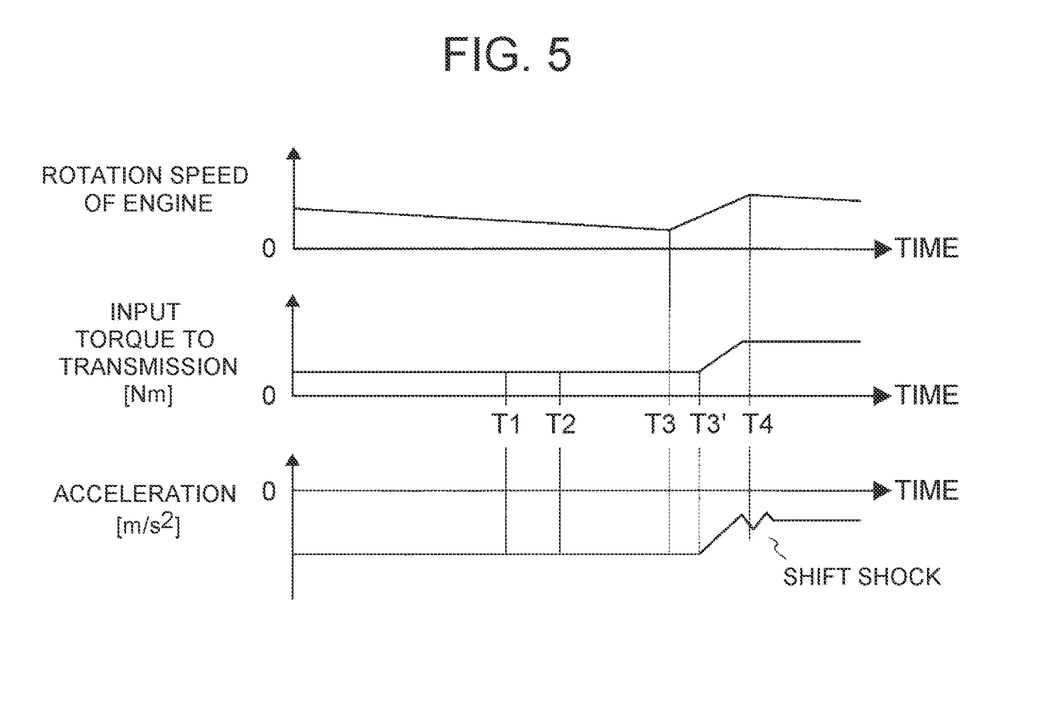
FIG. 5 is a view illustrating an example of the process according to a comparative example.

Thus, in the present embodiment, it is possible to prevent the regenerative power generation by the generator 300 from being stopped during the gear shift operation of the transmission 200. For comparison, as in FIG. 4, FIG. 5 shows that respective horizontal axes represent time, respective vertical axes represent a rotation speed of the engine, an input torque from the wheel side to the transmission 200, and an acceleration of the vehicle, and also shows respective time charts according to the process of the comparative example. In the entire period shown in FIG. 5, the vehicle is in the coasting state, and the acceleration of the vehicle is negative due to the negative driving force.

In the example shown in FIG. 5, the regenerative power generation by the generator 300 is stopped at time T3' within a transition period of the transmission 200 from time T3 to T4. Consequently, after time T3', a shift shock that the acceleration of the vehicle varies abruptly occurs for a certain period.

Effects

In the present embodiment, in the coasting state, when it is predicted that the downshift of the transmission 200 is started within a predetermined time and it is determined that the chargeable amount of the battery 400 may be decreased, the regenerative power generation is stopped before the start of the downshift, and a shock due to the stoppage of the regenerative power generation during the transition period of downshift is avoided. Accordingly, a preferable riding comfort can be obtained in the coasting state.

Second Embodiment

Hereinafter, the second embodiment will be described with reference to the drawings. Descriptions of the same matters as those in the first embodiment will be omitted or simplified. The configuration of each component of the braking force control apparatus 100 according to the present embodiment is the same as that of the first embodiment. In the present embodiment, the control unit 103 specifically predicts time t2 from a current time until the regenerative power generation of the generator 300 is stopped.

Process

Figure 6:
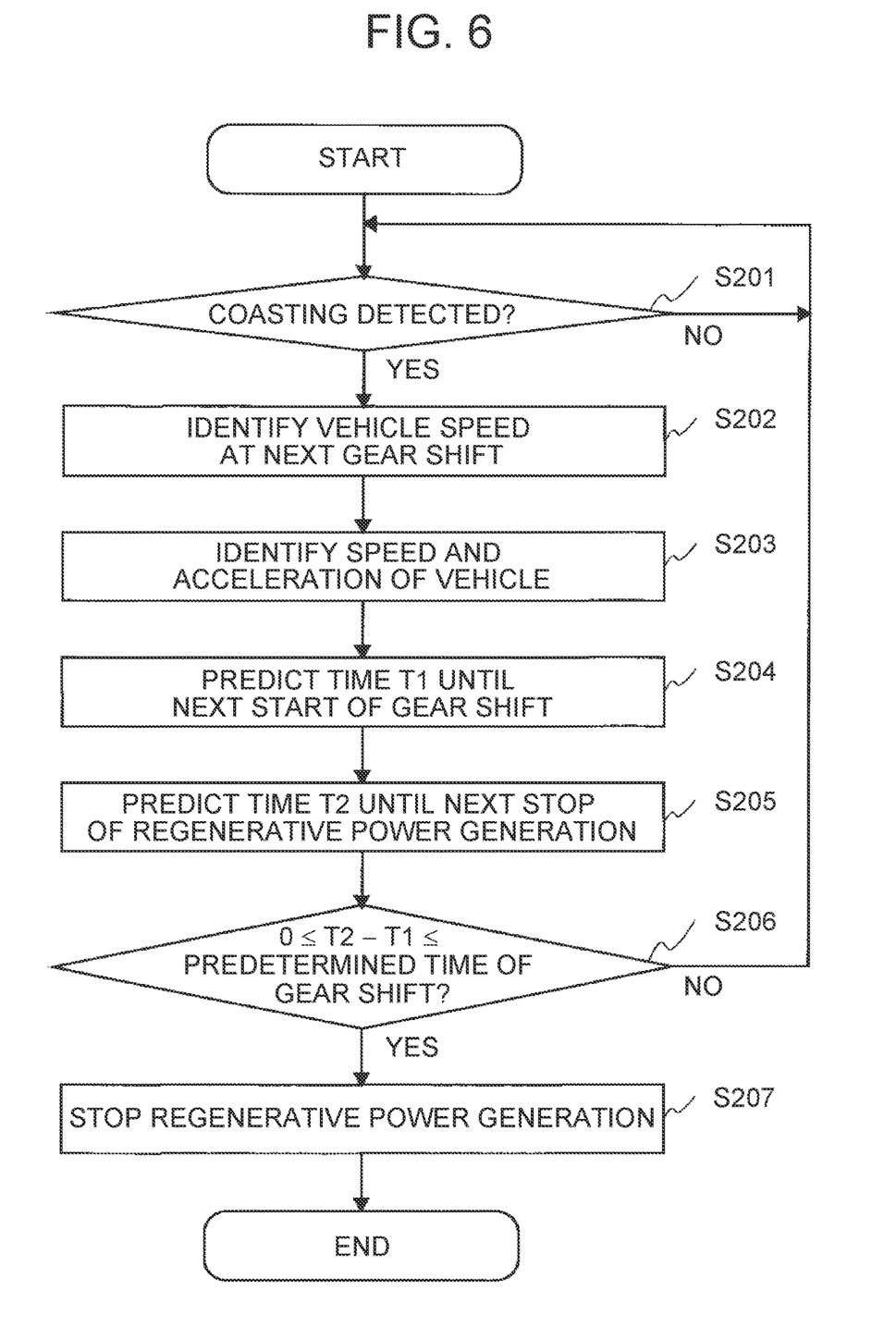
FIG. 6 is a flowchart showing the process according to the second embodiment.

FIG. 6 is a flowchart showing an example of control of the regenerative power generation performed by the braking force control apparatus 100 while the user is driving the vehicle. This process is executed in a state in which the regenerative power generation by the generator 300 is possible while the vehicle is powered on and can travel.

(Step S201 to S204): The process in each step is the same as that in steps S101 to S104 in the first embodiment. As in the first embodiment, when a coasting state is detected, time t1 from the current time until a next start of the gear shift operation occurs in the transmission 200 is predicted.

(Step S205): As in the first embodiment, the acquisition unit 102 acquires the state of the battery 400 that is charged by regenerative power generation of the generator 300.

Based on the state acquired by the acquisition unit 102, the control unit 103 predicts time t2 from the current time until the charge control unit, which controls the charge-discharge of the battery 400 and the regenerative power generation by the generator 300, stops the regenerative power generation by the generator 300. The control unit 103 can predict time t2 by performing a predetermined calculation based on, for example, the power storage rate and the charge current integrated value of the battery 400.

(Step S206): The control unit 103 determines whether or not it is predicted that the charge control unit stops the regenerative power generation within the transition period from the current time until a next start of the gear shift operation in the transmission 200. When a required period (the transition period) of the gear shift operation is defined as T, the condition that the regenerative power generation is stopped by the charge control unit within the transition period is expressed by the following Formula (2):

$$t1 \le t2 \le t1 + \text{the required period } T \qquad \text{Formula (2)}.$$

When Formula (2) is modified, the following Formula (3) is obtained:

$$0 \le t2 - t1 \le \text{the required period } T \qquad \text{Formula (3)}.$$

When Formula (2) (that is, Formula (3)) is established, the control unit 103 can determine that the regenerative power generation by the generator 300 may be stopped due to the state of the battery 400 during the gear shift operation of the transmission 200. When it is determined that the regenerative power generation may be stopped by the charge control unit within the transition period, the process proceeds to step S207; and otherwise, the process proceeds to step S201.

(Step S207): The control unit 103 requests the charge control unit to stop the regenerative power generation so as to stop the regenerative power generation by the generator 300 before the transmission 200 downshifts. This is the end of the process.

When the accelerator pedal sensor and the brake pedal sensor provided to the vehicle detect the operation of the accelerator pedal or the operation of the brake pedal by the user during execution of the process in steps S202 to S207, the process is stopped, and proceeds to step S201, in which the process is then suspended until the coasting state is established. Separately from this process, conventional control of acceleration, deceleration, gear shift, and the like according to the detected operation of the accelerator pedal or the detected operation of the brake pedal is performed by another control unit.

In addition, after the regenerative power generation is stopped by the above-described process in step S207, when the regenerative power generation by the generator 300 becomes possible because the power storage rate of the battery 400 becomes lower than a predetermined value, or the like, the regenerative power generation is resumed by another control unit. In this case, the above-described process is started again.

In the present embodiment, as with the first embodiment, as shown in the time chart of FIG. 4, it is possible to prevent the stop of the regenerative power generation from being executed by the generator 300 during the gear shift operation of the transmission 200.

Effect

In the present embodiment, in the coasting state, when it is predicted that the regenerative power generation may be stopped within a period predicted to be a transition period of downshift of the transmission 200, the regenerative power generation is stopped before the downshift is started. As a result, as in the first embodiment, it is possible to avoid a shift shock and obtain a preferable riding comfort in the coasting state.

As described above, the respective embodiments have been explained, and the present disclosure may be implemented by appropriately modifying or combining the features of the above-described embodiments. For example, in the second embodiment, in the case of performing the same process as that in step S105 of the first embodiment between step S204 and step S205 and when it is not predicted that the downshift of the transmission 200 will be started within the predetermined time, the stop of the regenerative power generation more than necessary may be suppressed without stopping the regenerative power generation. In each embodiment, as described above, typically, the coasting state established by the release of the accelerator pedal operation and the coasting state established by the release of the brake pedal operation are both detected as the coasting state (steps S101 and S201); however, only either of the both coasting states may be detected, instead.

The present disclosure can be deemed as not only the braking force control apparatus, but also a braking force control method, a braking force control program and a computer-readable non-transitory recording medium storing the same, as well as a braking force control system and a vehicle equipped with the same, all of which are performed by one or more computers included in the braking force control apparatus.

The present disclosure is useful for a braking force control apparatus mounted in a vehicle or the like.

What is claimed is:

1. A braking force control apparatus controlling a regenerative generator in a vehicle in which a negative force with a traveling direction of the vehicle set to be positive is generated by at least a stepped automatic transmission and the regenerative generator, wherein the braking force control apparatus:

predicts a time from a present time until a next start of a gear shift operation occurs in the stepped automatic transmission based on a speed of the vehicle;

acquires a state of a battery charged by the regenerative power generation of the regenerative generator; and stops the regenerative power generation by the regenerative generator before the gear shift of the stepped automatic transmission is started, when it is determined, during the regenerative power generation by the regenerative generator, that the regenerative power generation by the regenerative power generator may be stopped due to the state of the battery during the gear shift operation of the stepped automatic transmission, based on the predicted time and the state of the battery, wherein predicting the time from the present time until the next stop of the regenerative power generation by the regenerative generator occurs due to the state of the battery based on a power storage rate or a charge current integrated value as the state of the battery, and determining that the regenerative power generation by the regenerative generator may be stopped due to the state of the battery during the gear shift operation of the stepped automatic transmission, when the predicted time is not less than the time until the gear shift operation is started in the stepped automatic transmission, and when the predicted time is not more than a time obtained by adding a predetermined period of the gear shift operation to the time until the gear shift operation is started.

2. The braking force control apparatus according to claim 1, wherein stopping the regenerative power generation further includes determining that the regenerative power generation by the regenerative generator may be stopped due to the state of the battery during the gear shift operation of the stepped automatic transmission, when the predicted time is not more than a predetermined time and when a power storage rate or a charge current integrated value as the state of the battery is not less than a predetermined value.

3. The braking force control apparatus according to claim 1, wherein the predicted time from the present time until the next start of the gear shift operation occurs in the stepped automatic transmission, is based on a speed and an acceleration of the vehicle, and a predetermined speed of the vehicle at which the gear shift operation is started in the stepped automatic transmission.

* * * * *